United States Patent
Nishihashi et al.

(10) Patent No.: US 9,426,070 B2
(45) Date of Patent: Aug. 23, 2016

(54) SYSTEM AND METHOD FOR CONTROLLING TRANSFER OF A FRAME

(71) Applicant: FUJITSU LIMITED, Kawasaki-shi, Kanagawa (JP)

(72) Inventors: Tadayuki Nishihashi, Kanazawa (JP); Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 14/227,429

(22) Filed: Mar. 27, 2014

(65) Prior Publication Data

US 2014/0307733 A1 Oct. 16, 2014

(30) Foreign Application Priority Data

Apr. 10, 2013 (JP) ................................. 2013-082533

(51) Int. Cl.
*H04L 12/741* (2013.01)
*H04L 12/56* (2006.01)

(52) U.S. Cl.
CPC ........... *H04L 45/745* (2013.01); *H04L 45/741* (2013.01)

(58) Field of Classification Search
CPC ..... H04L 45/745; H04L 45/00; H04L 45/02; H04L 45/44; H04L 45/54; H04L 45/74
See application file for complete search history.

(56) References Cited

U.S. PATENT DOCUMENTS

| | | | | |
|---|---|---|---|---|
| 5,999,530 | A * | 12/1999 | LeMaire | H04L 12/1836 370/390 |
| 7,633,954 | B2 * | 12/2009 | Wakayama | H04L 45/00 370/392 |
| 7,924,837 | B1 * | 4/2011 | Shabtay | H04L 12/1886 370/235 |
| 8,437,349 | B2 * | 5/2013 | Kaganoi et al. | 370/390 |
| 8,774,130 | B2 * | 7/2014 | Jung et al. | 370/331 |
| 2004/0213272 | A1 | 10/2004 | Nishi et al. | |
| 2009/0109848 | A1 * | 4/2009 | Hato | H04L 12/4641 370/235 |
| 2011/0002337 | A1 * | 1/2011 | Akahane | H04L 45/00 370/395.53 |
| 2011/0110369 | A1 * | 5/2011 | Shiraki | H04L 49/102 370/389 |
| 2012/0275325 | A1 * | 11/2012 | Rikitake | H04L 43/0894 370/252 |
| 2014/0003285 | A1 * | 1/2014 | Jain | H04L 45/66 370/254 |
| 2014/0348022 | A1 * | 11/2014 | Jain | 370/254 |

FOREIGN PATENT DOCUMENTS

| | | |
|---|---|---|
| JP | 11-150553 | 6/1999 |
| JP | 11-191787 | 7/1999 |
| JP | 2004-304371 | 10/2004 |

* cited by examiner

*Primary Examiner* — Chi H Pham
*Assistant Examiner* — Weibin Huang
(74) *Attorney, Agent, or Firm* — Staas & Halsey LLP

(57) ABSTRACT

An apparatus is connected to a Layer 3 network through a gateway and communicates with lower-level devices. The apparatus includes a storage unit that stores information on a port connected to each lower-level device, in association with a group identifier identifying a terminal group including a plurality of terminals under control of each lower-level device. Upon receiving a frame whose destination information includes information specific to the gateway, the apparatus identifies, based on a terminal identifier identifying a terminal that is a destination of a packet within the frame, a group identifier identifying a terminal group to which the terminal belongs, and transfers the frame from a port associated with the group identifier to a lower-level device controlling the terminal group identified by the group identifier so that the lower-level device updates the destination information of the frame by using information specific to the terminal.

7 Claims, 13 Drawing Sheets

FIG. 5

| OPERATIONAL INFORMATION | UPPER-LEVEL |
|---|---|
| PASS-THROUGH NOTIFICATION BIT | TTT |

FIG. 6

| PORT | NETWORK ADDRESS | VLAN |
|---|---|---|
| 1 | 172.16.10.xx/24 | #1 |
| 2 | 172.16.20.xx/24 | #2 |
| 3 | 172.16.30.xx/24 | #3 |
| 4 | 172.16.40.xx/24 | #4 |

FIG. 7

| PORT | IP ADDRESS | MAC ADDRESS |
|---|---|---|
| — | — | — |

| PORT | IP ADDRESS | MAC ADDRESS |
|---|---|---|
| 1 | 172.16.40.1/24 | AAAA |
| 2 | 172.16.40.2/24 | BBBB |
| 3 | 172.16.40.3/24 | CCCC |
| 4 | 172.16.40.254/24 | UUUU |

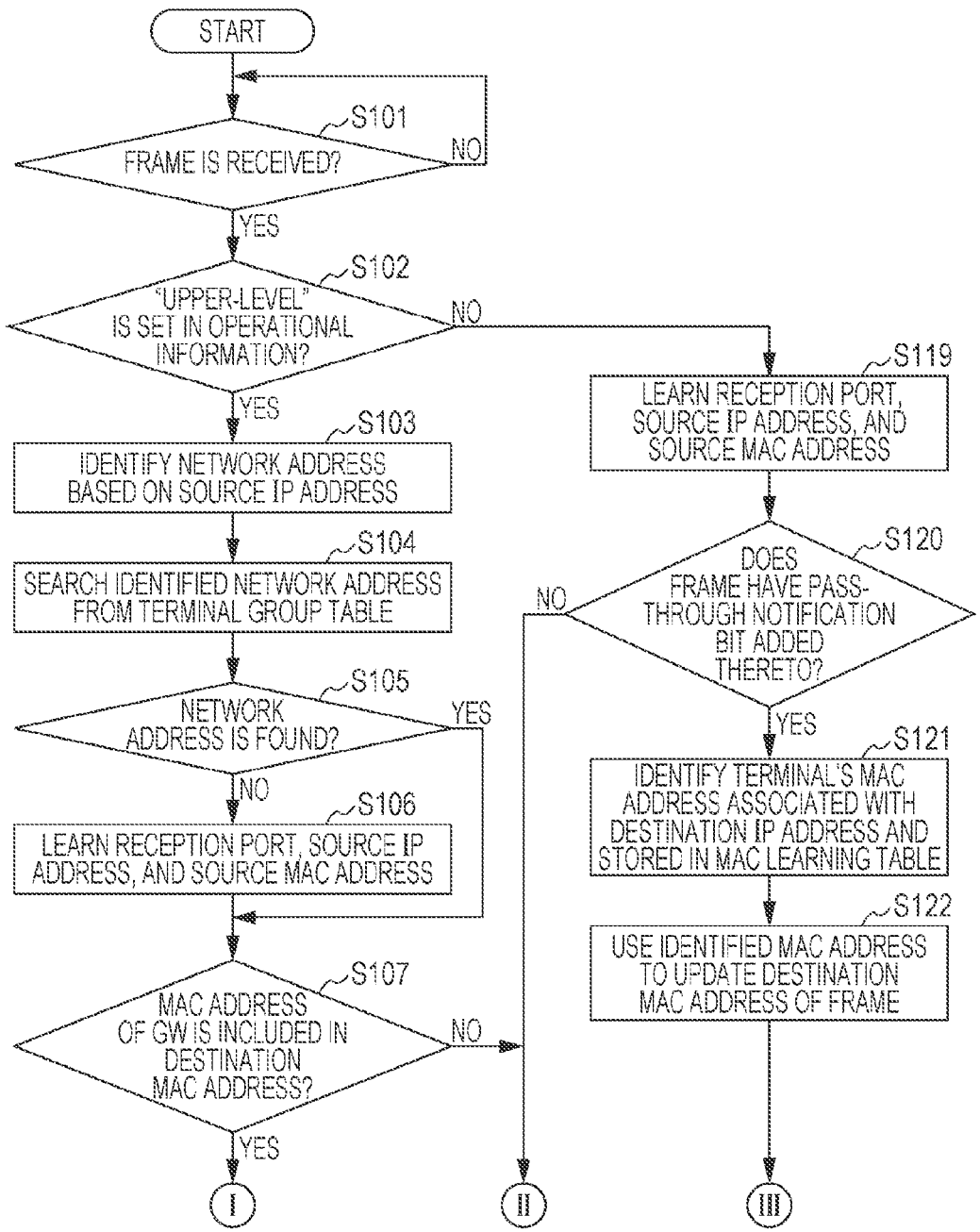

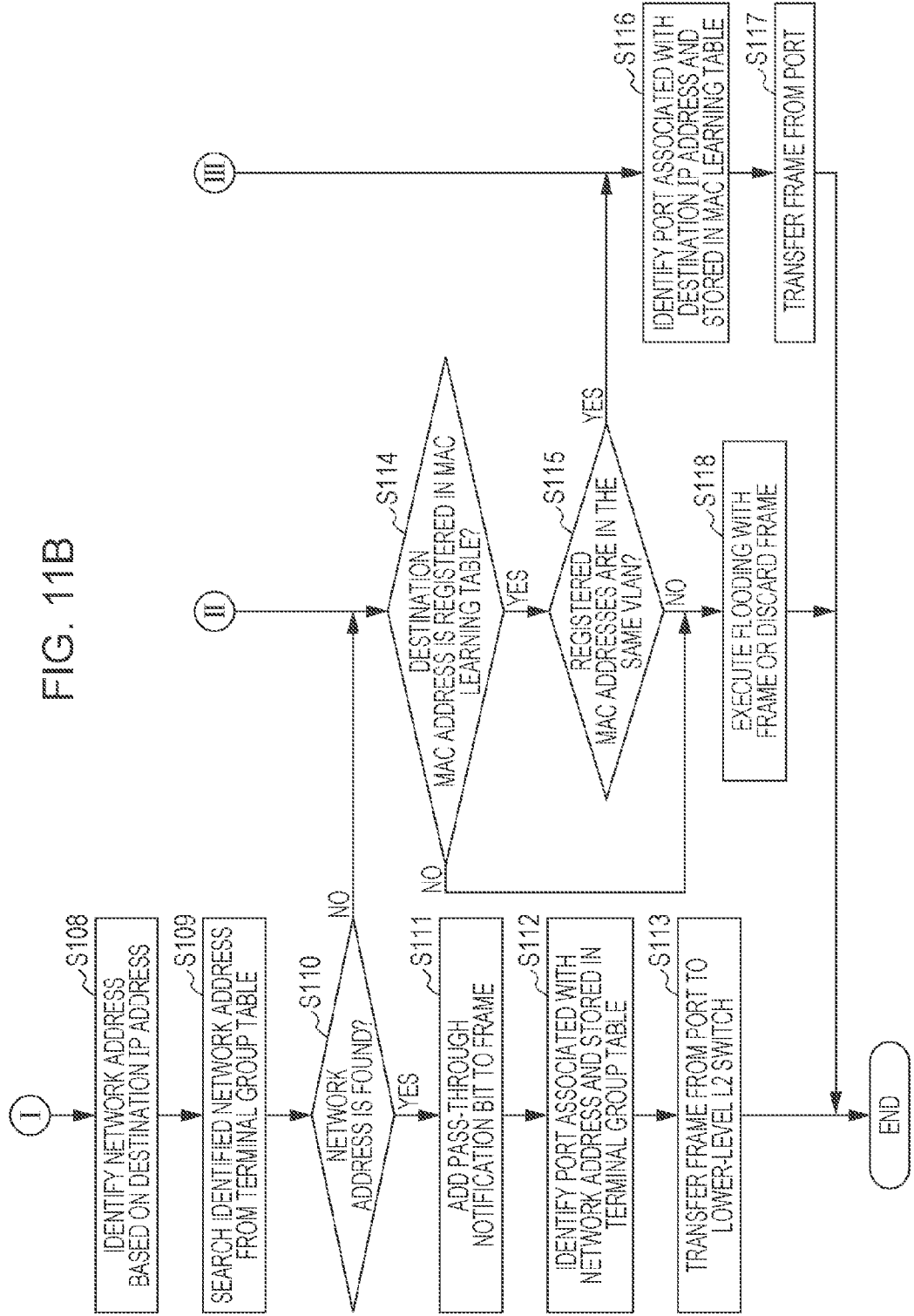

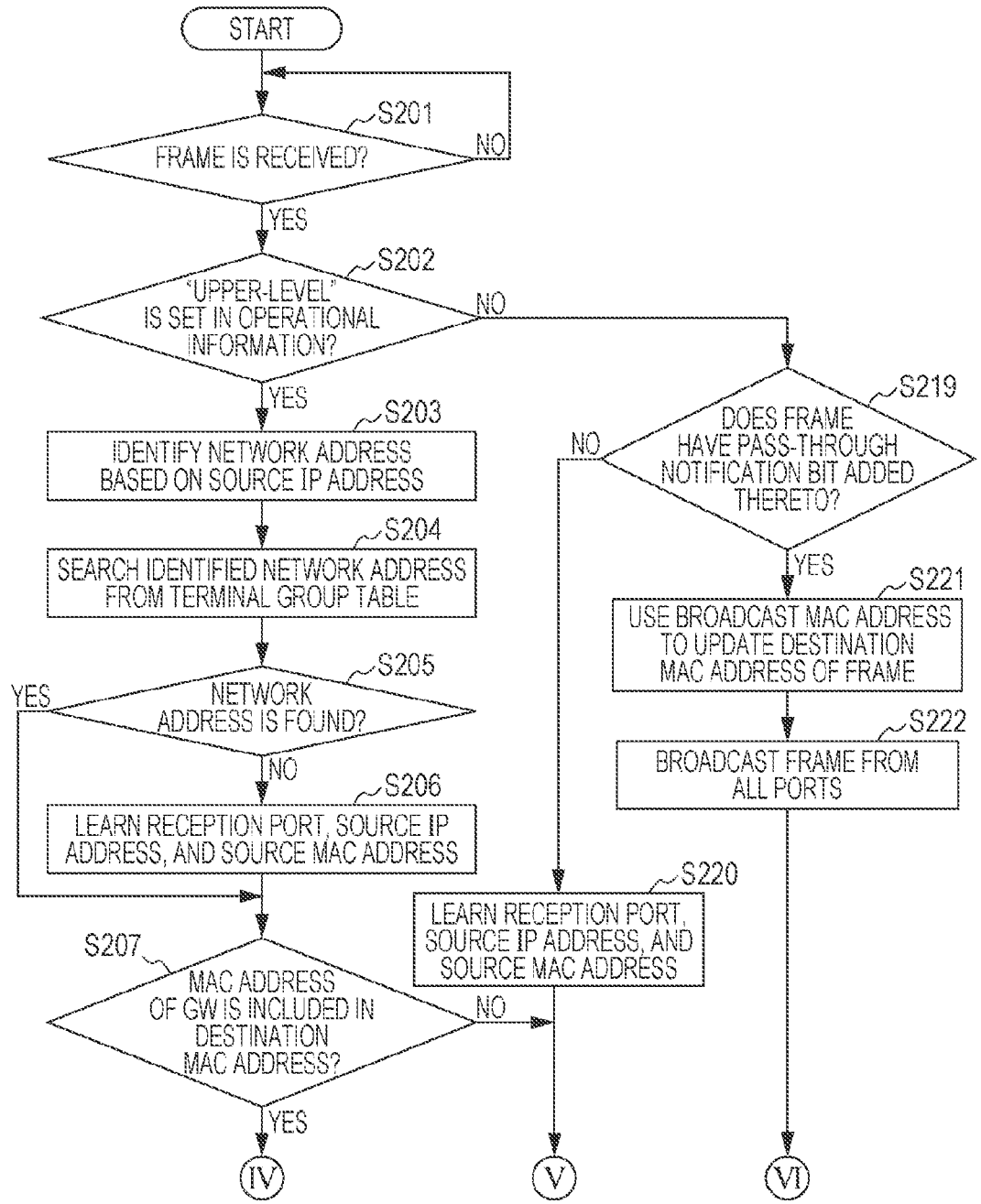

SYSTEM AND METHOD FOR CONTROLLING TRANSFER OF A FRAME

CROSS-REFERENCE TO RELATED APPLICATION

This application is based upon and claims the benefit of priority of the prior Japanese Patent Application No. 2013-082533, filed on Apr. 10, 2013, the entire contents of which are incorporated herein by reference.

FIELD

The embodiments discussed herein are related to a system and method for controlling transfer of a frame.

BACKGROUND

Traditionally, in a Layer 2 (L2) network, a switch (hereinafter referred to as "L2 switch") that is connected to a Layer 3 (L3) network through a gateway (GW) may be installed. A plurality of terminals under control of the L2 switch form a plurality of different terminal groups. A terminal group is called a segment or a virtual local area (VLAN) network. A network address that is a group identifier identifying a terminal group is assigned to each of the terminal groups. Internet Protocol (IP) addresses that are terminal identifiers each identifying a terminal belonging to the different terminal group do not match, since the network addresses that correspond to first halves of the IP addresses are different. Thus, when terminals that are among the terminals under control of the L2 switch and each belong to the different terminal group communicate with each other, a frame is transmitted and received between the terminals through the GW that is included in the L3 network and configured to execute routing using IP addresses.

However, while the amount of traffic in the L3 network has increased in recent years, a study has been carried out to reduce a processing load to be imposed on the GW of the L3 network. In order to reduce the processing load to be imposed on the GW of the L3 network, in a case where terminals under the L2 switch communicate with each other, it is preferable that frames are transferred without passing through the GW of the L3 network even if the terminals under the L2 switch each belong to the different terminal group.

As a technique for transferring a frame without passing through the GW of the L3 network, a technique using a flow table is known. In this technique, the L2 switch holds the flow table in which ports connected to terminals under the L2 switch, IP addresses of the terminals, and media access control (MAC) addresses of the terminals are associated with each other. When a frame that includes an MAC address of the GW of the L3 network in destination information is received by the L2 switch, the L2 switch identifies a terminal's MAC address that is stored in the flow table in association with a destination IP address identifying a terminal that is a destination of an IP packet within the frame. Then, the L2 switch uses the identified terminal's MAC address to update the MAC address of the GW of the L3 network which is the destination information of the received frame. Then, the L2 switch transfers the received frame having the updated destination information to the terminal under the L2 switch through a port whose information is stored in the flow table in association with the destination IP address. Thus, in a case where terminals under the L2 switch communicate with each other, frames are transferred without passing through the GW of the L3 network even if the terminals under the L2 switch belong to different terminal groups.

Japanese Laid-open Patent Publication No. 2004-304371 is an example of related art.

SUMMARY

According to an aspect of the invention, there is provided a system including an upper-level device and a plurality of lower-level devices configured to communicate with the upper-level device. The upper-level device that is connected to a Layer 3 network through a gateway includes a first storage unit, a searcher, and first transfer controller. The first storage unit stores information on a port connected to each of the plurality of lower-level devices, in association with a group identifier identifying a terminal group including a plurality of terminals under control of the each lower-level device. The searcher identifies, upon receiving a first frame whose destination information includes information specific to the gateway, based on a first terminal identifier identifying a first terminal that is a destination of a packet within the first frame, a first group identifier identifying a first terminal group to which the first terminal belongs, and searches the first storage unit for the identified first group identifier. The first transfer controller transfers, when the first group identifier is found in the first storage unit, the first frame from a port that is associated with the first group identifier in the first storage unit. The plurality of lower-level devices each include a second storage unit, an updating unit, and a second transfer controller. The second storage unit stores information on a port connected to each terminal belonging to a terminal group, a terminal identifier identifying the each terminal, and information specific to the each terminal, in association with each other. The updating unit updates the destination information of the first frame received from the upper-level device, by using information that is specific to the first terminal and stored in the second storage unit in association with the first terminal identifier. The second transfer controller transfers the first frame having the destination information updated by the updating unit from a port whose information is stored in the second storage unit in association with the first terminal identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a device information DB, according to a first embodiment;

FIG. 6 is a diagram illustrating an example of a terminal group table, according to a first embodiment;

FIG. 7 is a diagram illustrating an example of a MAC learning table, according to a first embodiment;

FIGS. 11A and 11B are diagrams illustrating an example of an operational flowchart executed by a switch communication system, according to a first embodiment;

FIGS. 13A and 13B are diagrams illustrating an example of an operational flowchart for a process that is executed by a switch communication system, according to a second embodiment;

DESCRIPTION OF EMBODIMENTS

For the conventional technique, however, it is not considered that the amount of a memory to be used when frames are transferred without passing through the GW of the L3 network is suppressed.

Specifically, in the conventional technique, the L2 switch associates ports, IP addresses, and MAC addresses for all terminals under the L2 switch so as to cause the flow table to learn the associations. The flow table is stored in a memory included in the L2 switch. Thus, as the number of terminals under the L2 switch increases, the number of entries of the flow table increases. As a result, the amount of a memory to be used may be increased.

Hereinafter, embodiments of a communication system disclosed herein, a communication method disclosed herein, and an upper-level device disclosed herein are described in detail with reference to the accompanying drawings. In the following embodiments, description will be given of an example in which the communication system disclosed herein is applied to a switch communication system that includes an upper-level Layer 2 (L2) switch connected to a Layer 3 (L3) network through a gateway (GW) and a plurality of lower-level L2 switches configured to communicate with the upper-level L2 switch. Note that the communication system disclosed herein, the communication method disclosed herein, and the upper-level device disclosed herein are not limited to the embodiments.

First Embodiment

Figure 1:
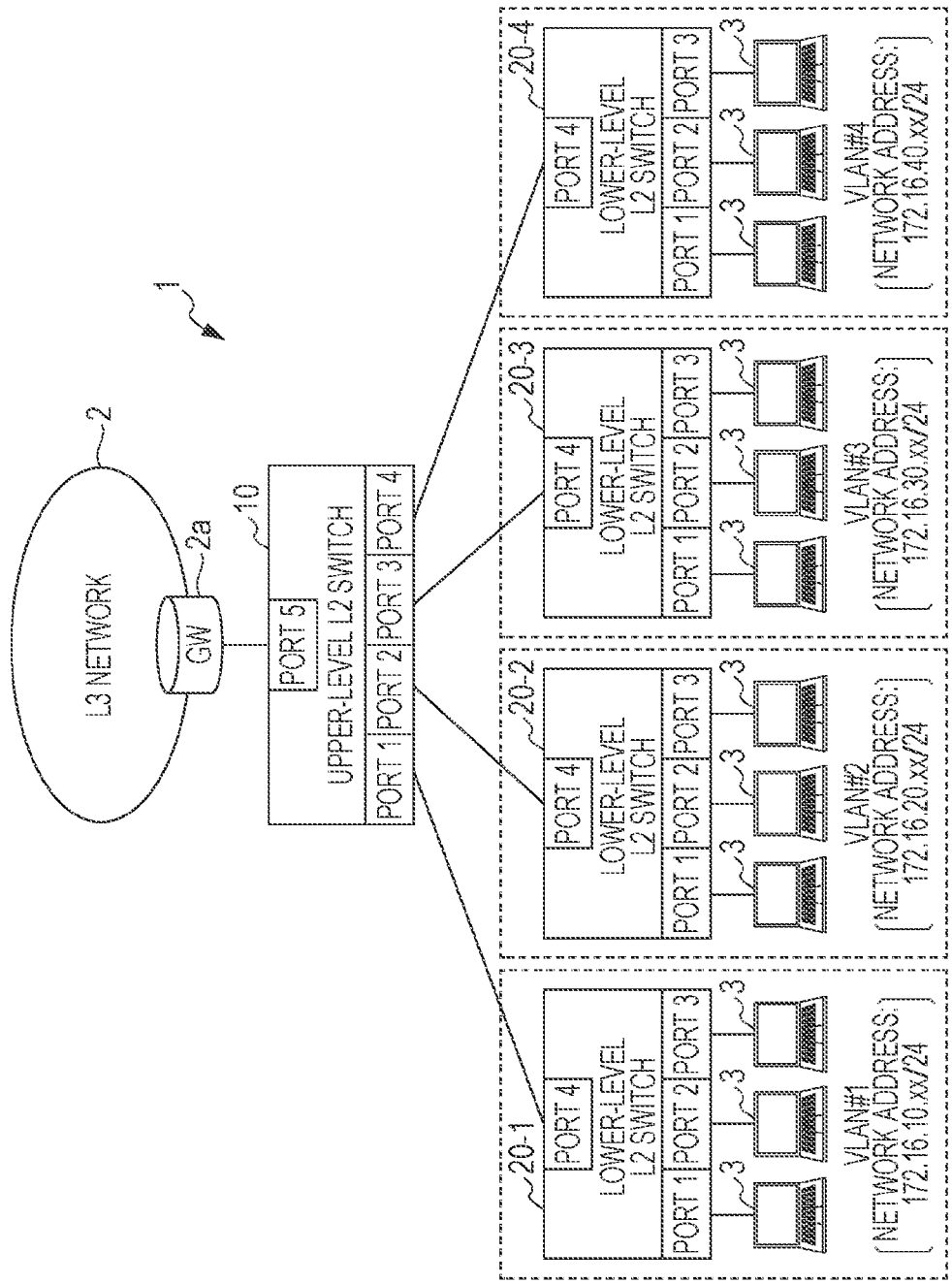
FIG. 1 is a diagram illustrating an example of a configuration of a switch communication system, according to a first embodiment.

First, an example of a configuration of a switch communication system 1 according to a first embodiment is described with reference to FIG. 1. FIG. 1 is a diagram illustrating an example of a configuration of a switch communication system, according to a first embodiment. As illustrated in FIG. 1, the switch communication system 1 includes an upper-level L2 switch 10 connected to an L3 network 2 through a GW 2a and lower-level L2 switches 20-1 to 20-4 configured to communicate with the upper-level L2 switch 10.

The upper-level L2 switch 10 is connected to the GW 2a through a port 5 of the upper-level L2 switch 10. The upper-level L2 switch 10 is connected to a port 4 of the lower-level switch 20-1 through a port 1 of the upper-level L2 switch 10. The upper-level L2 switch 10 is connected to a port 4 of the lower-level switch 20-2 through a port 2 of the upper-level L2 switch 10. The upper-level L2 switch 10 is connected to a port 4 of the lower-level switch 20-3 through a port 3 of the upper-level L2 switch 10. The upper-level L2 switch 10 is connected to a port 4 of the lower-level switch 20-4 through a port 4 of the upper-level L2 switch 10.

The lower-level L2 switch 20-1 is connected to a plurality of terminals 3 under the lower-level L2 switch 20-1 through ports 1 to 3 of the lower-level L2 switch 20-1. The lower-level L2 switch 20-2 is connected to a plurality of terminals 3 under the lower-level L2 switch 20-2 through ports 1 to 3 of the lower-level L2 switch 20-2. The lower-level L2 switch 20-3 is connected to a plurality of terminals 3 under the lower-level L2 switch 20-3 through ports 1 to 3 of the lower-level L2 switch 20-3. The lower-level L2 switch 20-4 is connected to a plurality of terminals 3 under the lower-level L2 switch 20-4 through ports 1 to 3 of the lower-level L2 switch 20-4. In the following description, the lower-level L2 switches 20-1 to 20-4 are collectively referred to as "lower-level L2 switches 20" unless otherwise distinguished.

The terminals 3 under the lower-level L2 switches 20 form terminal groups. In the example illustrated in FIG. 1, the plurality of terminals 3 under the lower-level L2 switch 20-1 form a virtual local area network (VLAN) #1 as a terminal group. The plurality of terminals 3 under the lower-level L2 switch 20-2 form a virtual local area network (VLAN) #2 as a terminal group. The plurality of terminals 3 under the lower-level L2 switch 20-3 form a virtual local area network (VLAN) #3 as a terminal group. The plurality of terminals 3 under the lower-level L2 switch 20-4 form a virtual local area network (VLAN) #4 as a terminal group.

Network addresses that are group identifiers identifying the terminal groups are assigned to the terminal groups, respectively. The network addresses correspond to first halves of IP addresses that are terminal identifiers identifying the terminals 3 belonging to the terminal groups. In the example illustrated in FIG. 1, a network address "172.16.10.xx/24" is assigned to the VLAN #1. A network address "172.16.20.xx/24" is assigned to the VLAN #2. A network address "172.16.30.xx/24" is assigned to the VLAN #3. A network address "172.16.40.xx/24" is assigned to the VLAN #4.

In the aforementioned configuration, the upper-level L2 switch 10 includes a first storage unit that stores information on the ports connected to the lower-level L2 switches 20 in association with group identifiers identifying the terminal groups formed by the terminals 3 under the lower-level L2 switches 20. Upon receiving a frame that includes information specific to the GW 2a in destination information, the upper-level L2 switch 10 identifies, based on a terminal identifier identifying the terminal 3, a group identifier to which the terminal 3 that is a destination of an IP packet within the frame belongs. Then, the upper-level L2 switch 10 searches the first storage unit for the identified group identifier When the group identifier is found, the upper-level L2 switch 10 transfers the frame to a lower-level L2 switch from a port that is associated with the found group identifier in the first storage unit.

The lower-level L2 switches 20 each include a second storage unit that stores information on ports connected to terminals 3 belonging to an interested terminal group, terminal identifiers identifying the terminals 3, and information specific to the terminals 3, in association with each other.

The lower-level L2 switch 20 updates destination information of a frame using information specific to a terminal 3 that is stored in an interested second storage unit in association with a terminal identifier identifying the terminal 3 that is a destination of an IP packet within the frame transferred from the upper-level L2 switch 10. Then, the lower-level L2 switch 20 transfers the frame having the updated destination information to the terminal 3 from an interested port whose information is stored in the second storage unit in association with the terminal identifier.

When the upper-level L2 switch 10 according to the first embodiment receives a frame including information specific to the GW 2a in destination information, and a group identifier identified based on a destination of an IP packet within the frame is associated with a port connected to a lower-level L2 switch 20, the upper-level L2 switch 10 according to the first embodiment transfers the frame from the interested port. For example, it is assumed that the upper-level L2 switch 10 includes the first storage unit that stores information on the ports 1 to 4 connected to the lower-level L2 switches 20 in association with the network addresses identifying the VLANs #1 to #4 formed by the terminals 3 under the lower-level L2 switches 20 so that the ports 1 to 4 are associated with the network addresses. In addition, it is assumed that the upper-level L2 switch 10 receives, from the lower-level L2 switch 20-1, a frame that includes a media access control (MAC) address of the GW 2a in a destination MAC address and includes an IP address of a terminal under the lower-level L2 switch 20-4 in a destination IP address. In this case, the upper-level L2 switch 10 searches for a port 4 connected to the lower-level L2 switch 20-4 corresponding to the network address "172.16.40.xx/24" identified based on the destination IP address of an IP packet within the frame, and transfers the frame from the port 4. Specifically, when the upper-level L2 switch 10 receives a frame to be transferred to the GW 2a and the received frame is to be transmitted and received between terminals 3 under a lower-level L2 switch 20, the upper-level L2 switch 10 transfers the frame to the lower-level L2 switch 20 without causing the frame to pass through the GW 2a. The lower-level L2 switch 20 that receives the frame uses a MAC address of a terminal 3 under the lower-level L2 switch 20 to update the destination MAC address of the frame from the MAC address of the GW 2a to the MAC address of the terminal 3, and transfers the frame having the updated destination information to the terminal 3 under the lower-level L2 switch 20.

In this way, the upper-level L2 switch 10 holds only association relationships between the ports and the network addresses that are the first halves of the IP addresses. The upper-level L2 switch 10 may transfer, based on the association relationships, a frame to a terminal under a lower-level L2 switch 20 without causing the frame to pass through the GW of the L3 network. As a result, the upper-level L2 switch 10 may suppress the amount of a memory to be used when a frame is transferred without passing through the GW of the L3 network, compared with the conventional technique for learning association relationships among ports, IP addresses, and MAC addresses for all terminals under an L2 switch.

In addition, since the lower-level L2 switches 20 each hold association relationships among ports, IP addresses, and MAC addresses within a single VLAN, the lower-level L2 switches 20 may each suppress the amount of a memory to be used, compared with a conventional technique for learning association relationships for a plurality of VLANs by a single L2 switch.

Figure 2:
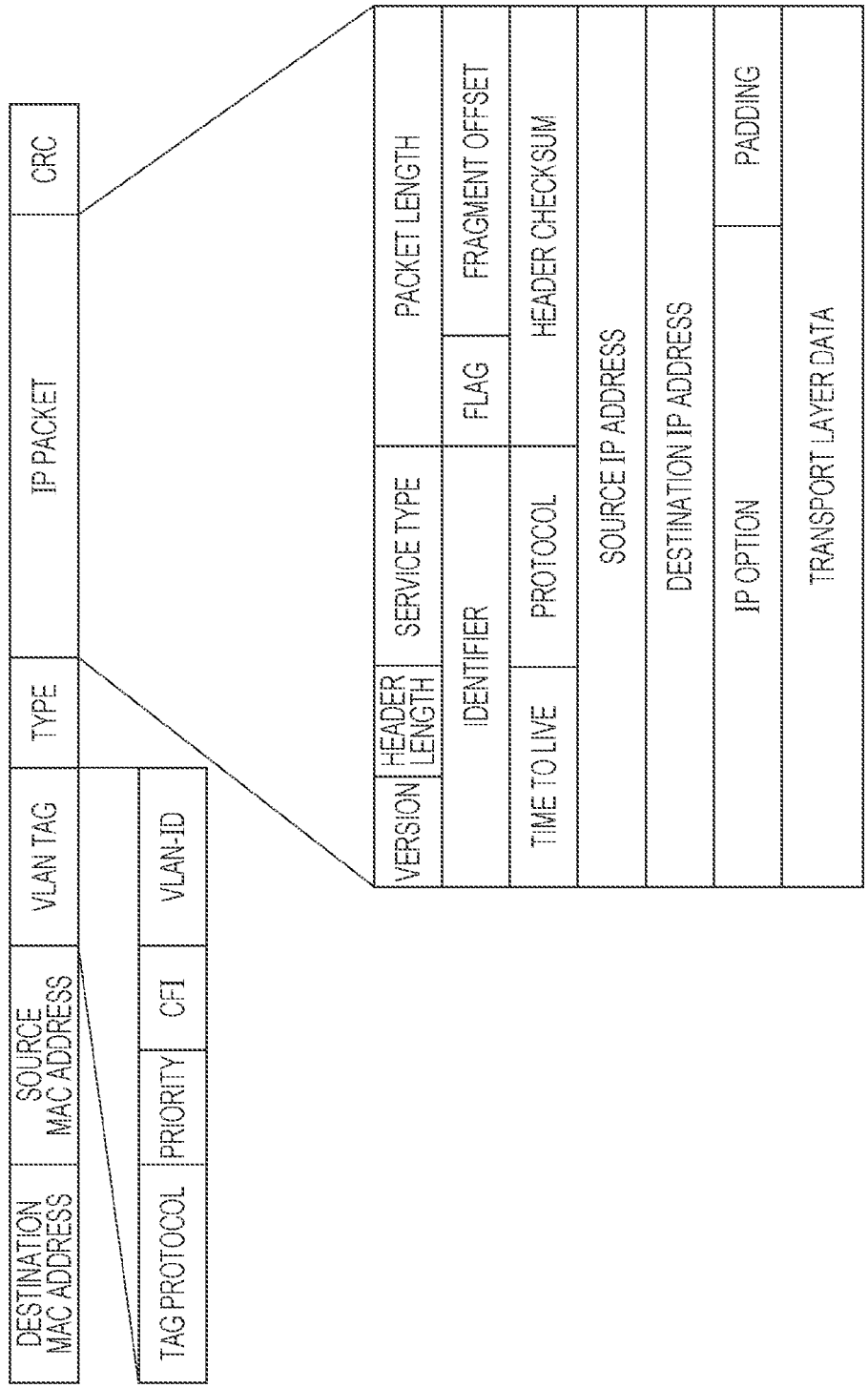
FIG. 2 is a diagram illustrating an example of a format of a frame, according to a first embodiment.

Next, an example of a format of a frame according to the first embodiment is described with reference to FIG. 2. FIG. 2 is a diagram illustrating an example of a format of a frame, according to a first embodiment. A frame illustrated in FIG. 2 includes a destination MAC address, a source MAC address, a VLAN tag, a type, an IP packet, and a cyclic redundancy check (CRC). The VLAN tag includes a tag protocol, a priority, a canonical format indicator (CFI), and a VLAN-ID.

The IP packet within the frame includes a version, a header length, a service type, a packet length, an identifier, a flag, a fragment offset, a time to live, a protocol, and a header checksum. The IP packet within the frame further includes a source IP address, a destination IP address, an IP option, padding, and transport layer data. The source IP address corresponds to a terminal identifier identifying a terminal that is a source of the IP packet. The destination IP address corresponds to a terminal identifier identifying a terminal that is a destination of the IP packet. First halves of IP addresses that are stored in the source IP address and destination IP address as terminal identifiers correspond to network addresses that are group identifiers identifying terminal groups to which terminals belong.

Figure 3:
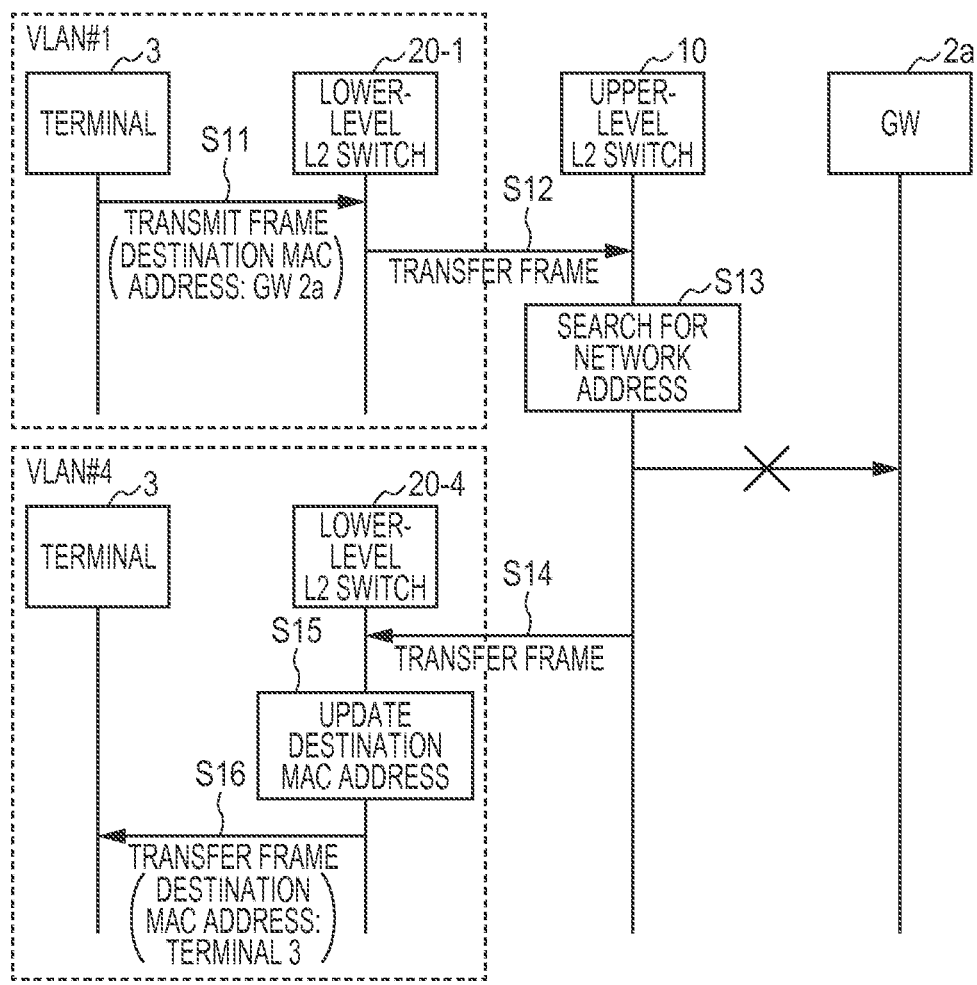
FIG. 3 is a diagram illustrating an example of a communication method executed by a switch communication system, according to a first embodiment.

Next, an example of a communication method that is executed by the switch communication system 1 according to the first embodiment is described with reference to FIG. 3. FIG. 3 is a diagram illustrating an example of a communication method executed by a switch communication system, according to a first embodiment. An example in which a terminal 3 belonging to the VLAN #1 and a terminal 3 belonging to the VLAN #4 communicate with each other is described with reference to FIG. 3.

As illustrated in FIG. 3, the terminal 3 belonging to the VLAN #1 transmits, to the lower-level L2 switch 20-1, a frame that includes the MAC address of the GW 2a in a destination MAC address and includes an IP address of the terminal 3 belonging to the VLAN #4 in a destination IP address (in step S11).

The lower-level L2 switch 20-1 receives the frame. Since the received frame does not have a pass-through notification bit, the lower-level L2 switch 20-1 transfers the frame to the upper-level L2 switch 10 without updating the destination MAC address of the frame (in step S12).

The upper-level L2 switch 10 receives the frame. The upper-level L2 switch 10 identifies, based on the destination IP address of an IP packet within the received frame, the network address of the VLAN #4 to which the destination terminal 3 belongs, and the upper-level L2 switch 10 searches the first storage unit for the identified network address (in step S13). In the first storage unit, the port 4 connected to the lower-level L2 switch 20-4 is associated with the network address "172.16.40.xx/24" identifying the VLAN #4 that is the terminal group formed by the terminals 3 under control of the lower-level L2 switch 20-4.

Since the network address of the VLAN #4 is found from the first storage unit, the upper-level L2 switch 10 transfers the frame to the lower-level L2 switch 20-4 from the port 4 associated with the network address that has been found from the first storage unit (in step S14). In this case, the upper-level L2 switch 10 adds, to the frame, a notification bit (hereinafter referred to as "pass-through notification bit" in some cases) indicating that the frame is not transferred to the GW 2a, and the upper-level L2 switch 10 transfers the frame having the pass-through notification bit added thereto. Even when the upper-level L2 switch 10 receives the frame whose destination is set at the GW 2a, the received frame is a frame to be eventually transmitted and received between terminals 3 belonging to different VLANs. Therefore, the upper-level L2 switch 10 transfers the received frame to the lower-level L2 switch 20-4 without causing the received frame to pass through the GW 2a.

The lower-level L2 switch 20-4 receives the frame transferred by the upper-level L2 switch 10. The lower-level L2 switch 20-4 determines whether or not the received frame has the pass-through notification bit added thereto. In the case, since the received frame has the pass-through notification bit added thereto, the lower-level L2 switch 20-4 identifies a MAC address of the terminal 3 that is stored in the second storage unit in association with the destination IP address of the IP packet within the frame. The lower-level L2 switch 20-4 uses the identified MAC address of the terminal 3 to update the destination MAC address of the frame (in step S15). Specifically, the lower-level L2 switch 20-4 updates the destination MAC address of the frame from the MAC address of the GW 2a to the MAC address of the terminal 3.

After that, the lower-level L2 switch 20-4 transfers the frame having the updated destination MAC address to the terminal 3 from a port whose information is stored in the second storage unit in association with the destination IP address of the IP packet within the frame (in step S16).

In this manner, the upper-level L2 switch 10 holds only the association relationships between the ports and the network addresses that are the first halves of the IP addresses, and transfers a frame to a terminal under a lower-level L2 switch 20 without causing the frame to pass through the GW of the L3 network. As a result, the upper-level L2 switch 10 may suppress the amount of a memory to be used when a frame is transferred without passing through the GW of the L3 network, compared with the conventional technique for learning association relationships among ports, IP addresses, and MAC addresses for all terminals under an L2 switch. In addition, since the lower-level L2 switches 20 each hold association relationships among ports, IP addresses, and MAC addresses within a single VLAN, the lower-level L2 switches 20 may each suppress the amount of a memory to be used, compared with the conventional technique for learning association relationships for a plurality of VLANs by a single L2 switch. As a result, the upper-level L2 switch 10 and the lower-level L2 switches 20 may each suppress the amount of a memory to be used when a frame is transferred without passing through the GW of the L3 network.

In addition, the upper-level L2 switch 10 adds, to a frame, the pass-through notification bit indicating that the frame is not transferred to the GW. Then, the upper-level L2 switch 10 transfers the frame having the pass-through notification bit added thereto to a lower-level L2 switch 20. When the transferred frame has the pass-through notification bit added thereto, the lower-level L2 switch 20 updates a destination MAC address of the frame using a MAC address of a terminal 3 that is stored in the second storage unit in association with a destination IP address of an IP packet within the frame. Thus, since the lower-level L2 switch 20 updates only the destination information of the frame having the pass-through notification bit added thereto, the lower-level L2 switch 20 may reduce a processing load to be imposed due to the updating of the destination information.

Figure 4:
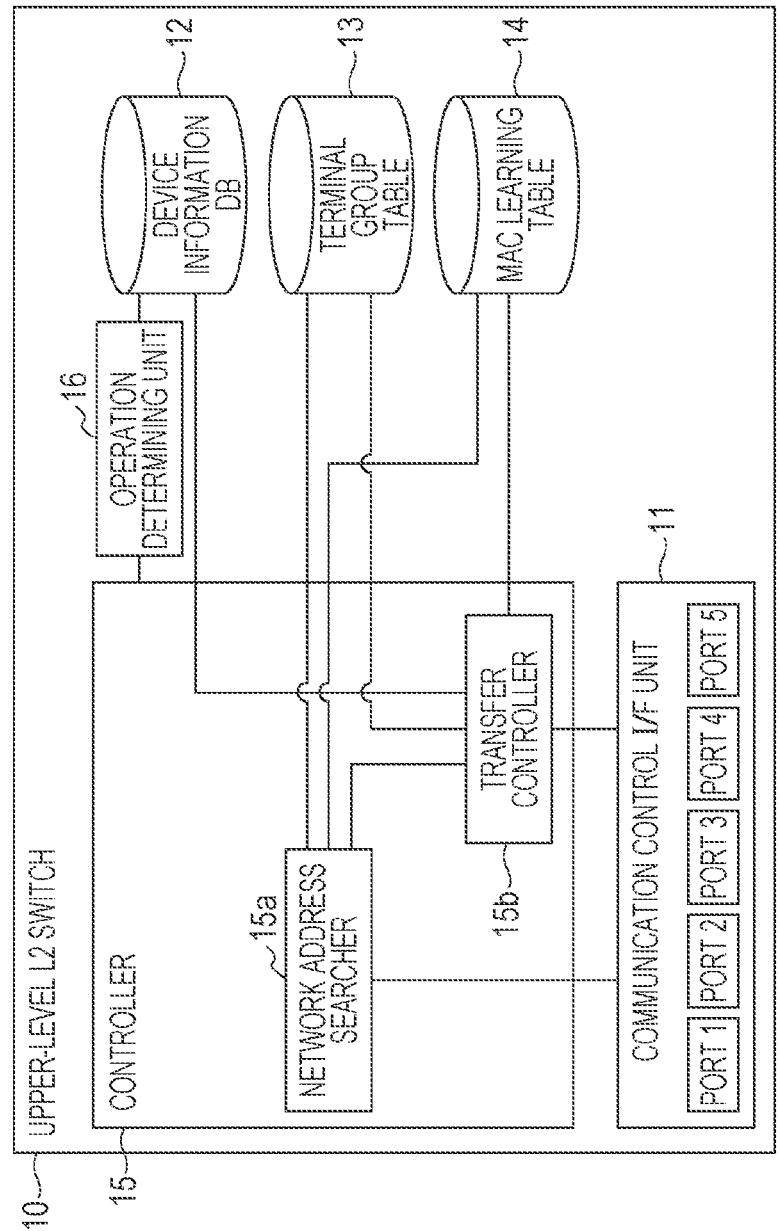
FIG. 4 is a diagram illustrating a configuration example of an upper-level L2 switch, according to a first embodiment.

Next, a configuration of the upper-level L2 switch 10 illustrated in FIG. 1 is described. FIG. 4 is a diagram illustrating a configuration example of an upper-level L2 switch, according to a first embodiment. As illustrated in FIG. 4, the upper-level L2 switch 10 include a communication control interface (I/F) unit 11, a device information database (DB) 12, a terminal group table 13, a MAC learning table 14, a controller 15, and an operation determining unit 16.

The controller 15 and the operation determining unit 16 may be integrated circuits or electronic circuits. The device information DB 12, the terminal group table 13, and the MAC learning table 14 may be storage devices such as semiconductor elements or hard disks.

The communication control I/F unit 11 is an interface that has ports 1 to 5 with port numbers 1 to 5 assigned thereto and is configured to control communication with other devices. The communication control I/F unit 11 receives a frame via a predetermined port and outputs the received frame to a network address searcher 15a (described later). The communication control I/F unit 11 transmits a frame output from a transfer controller 15b to a destination of the frame via a predetermined port.

The device information DB 12 is a database storing various types of setting information on the upper-level L2 switch 10. FIG. 5 is a diagram illustrating an example of a device information DB, according to a first embodiment. As illustrated in FIG. 5, the device information DB 12 stores operational information and the pass-through notification bit as the setting information. The operational information is information that indicates whether the upper-level L2 switch 10 operates as an upper-level L2 switch or a lower-level L2 switch. In the example illustrated in FIG. 5, the upper-level L2 switch 10 operates as an upper-level L2 switch and thus "upper-level" is stored in the operational information. The pass-through notification bit is information that is added to a frame by the upper-level L2 switch 10 when the upper-level L2 switch 10 transfers the frame destined for the GW 2a to a lower-level L2 switch without passing the frame to the GW 2a.

The terminal group table 13 is a table that stores information on the ports connected to the lower-level L2 switches 20 in association with the group identifiers identifying the terminal groups formed by the terminals 3 under the lower-level L2 switches 20. The terminal group table 13 corresponds to an example of the first storage unit. FIG. 6 is a diagram illustrating an example of a terminal group table, according to a first embodiment. As illustrated in FIG. 6, the terminal group table 13 stores items for the ports, the network addresses, and the VLANs, in association with each other.

In FIG. 6, the item 'port' indicates an identification number of a port connected to the lower-level L2 switches 20. The item 'network address' is a group identifier identifying a terminal group formed by the terminals under the lower-level L2 switches 20. The item 'VLAN' indicates a VLAN-ID of the VLAN formed as the terminal group.

For example, a first row of the terminal group table illustrated in FIG. 6 indicates that the terminals 3 under the lower-level L2 switch 20-1 connected to the port 1 having the port number "1" form the "VLAN #1" as a terminal group and the network address identifying the VLAN #1 is "172.16.10.xx/24". A second row of the terminal group table illustrated in FIG. 6 indicates that the terminals 3 under the lower-level L2 switch 20-2 connected to the port 2 having the port number "2" form the "VLAN #2" as a terminal group and the network address identifying the VLAN #2 is "172.16.20.xx/24". A third row of the terminal group table illustrated in FIG. 6 indicates that the terminals 3 under the lower-level L2 switch 20-3 connected to the port 3 having the port number "3" form the "VLAN #3" as a terminal group and the network address identifying the VLAN #3 is "172.16.30.xx/24". A fourth row of the terminal group table illustrated in FIG. 6 indicates that the terminals 3 under the lower-level L2 switch 20-4 connected to the port 4 having the port number "4" form the "VLAN #4" as a terminal group and the network address identifying the VLAN #4 is "172.16.40.xx/24".

The MAC learning table 14 stores information on a port, an identifier identifying a device connected to the port, and information specific to the device connected via the port, in association with each other. Every time the MAC learning table 14 learns an association relationship, information on the association relationship (entry) is registered in the MAC learning table 14. FIG. 7 is a diagram illustrating an example of a MAC learning table, according to a first embodiment. As illustrated in FIG. 7, the MAC learning table 14 stores items for the port, an IP address, and a MAC address, in association with each other.

The item 'port' indicates an identification number of a port. The item 'IP address' indicates the identifier identifying a device connected via the port. The item 'MAC address' indicates the information specific to the device connected via the port. The example illustrated in FIG. 7 indicates a state before an IP address and a MAC address are learned. In the first embodiment, when a frame is received and a network address that is included in a destination IP address of an IP packet within the received frame is not registered in the terminal group table 13, on a port via which the frame is received, a source IP address, and a source MAC address are learned, and information thereon is stored in the MAC learning table 14. On the other hand, when the network address included in the destination IP address is registered in the terminal group table 13, information on the port, the source IP address, and the source MAC address are not learned, and information thereon is not stored in the MAC learning table 14. Specifically, for a terminal 3 belonging to a terminal group to which the network address registered in the terminal group table 13 is assigned, an association relationship among the port via which the frame is received, the IP address, and the MAC address is not learned, and information thereon is not stored in the MAC learning table 14.

Returning to FIG. 4, the controller 5 is a controller configured to control transfer of a frame, and includes the network address searcher 15a and the transfer controller 15b. The controller 15 may include an internal memory storing various types of data, a control program, and a program defining various process procedures.

Upon receiving a frame that includes the MAC address of the GW 2a in a destination MAC address, the network address searcher 15a identifies a network address based on a destination IP address of an IP packet within the frame. The network address searcher 15a searches the terminal group table 13 for the identified network address. The network address searcher 15a corresponds to an example of a searcher. For example, it is assumed that the network address searcher 15a receives, from the lower-level L2 switch 20-1, a frame that includes the MAC address of the GW 2a in a destination MAC address and includes an IP address of a terminal 3 belonging to the VLAN #4 in a destination IP address.

In this case, the network address searcher 15a determines whether or not the MAC address of the GW 2a is included in the destination MAC address in the frame. In the case, since the MAC address of the GW 2a is included in the destination MAC address, the network address searcher 15a identifies the network address based on the destination IP address of the IP packet within the frame. Then, the network address searcher 15a searches the terminal group table 13 for the identified network address. For example, the network address searcher 15a searches the terminal group table 13 for the network address "172.16.40.xx/24" identifying the VLAN #4 that is the terminal group formed by the terminals 3 under the lower-level L2 switch 20-4. After that, the network address searcher 15a outputs the network address "172.16.40.xx/24" that has been found and the received frame to the transfer controller 15b.

When the MAC address of the GW 2a is not included in the destination MAC address or the identified network address is not found from the terminal group table 13, the network address searcher 15a outputs the received frame to the transfer controller 15b.

When an arbitrary frame is received, the network address searcher 15a identifies a network address based on a source IP address of an IP packet within the received frame and searches the terminal group table 13 for the identified network address. When the network address is not found, the network address searcher 15a associates a port via which the arbitrary frame is received, the source IP address, and a source MAC address with each other, and learns information thereon by storing the information in the MAC learning table 14. On the other hand, when the network address is found, the network address searcher 15a does not learn the port at which the arbitrary frame is received, the source IP address, and the source MAC address, and does not store information thereon in the MAC learning table 14.

For example, it is assumed that the network address searcher 15a receives an arbitrary frame via the port 5 from the GW 2a. In this case, the network address searcher 15a identifies a network address based on a source IP address of an IP packet within the received frame and searches the terminal group table 13 for the identified network address. The frame received from the GW 2a is a frame transmitted from a source included in another L2 network connected to the L3 network 2, and the network address identified based on the source IP address of the IP packet within the frame is not registered in the terminal group table 13. Since the network address is not found, the network address searcher 15a associates the port 5 via which the frame is received, the source IP address of the IP packet within the frame, and the source MAC address of the frame with each other, and learns information thereon by storing the information in the MAC learn table 14.

For example, it is assumed that the network address searcher 15a receives an arbitrary frame via the port 1 from the lower-level L2 switch 20-1. In this case, the network address searcher 15a identifies a network address based on a source IP address of an IP packet within the received frame and searches the terminal group table 13 for the identified network address. The frame received from the lower-level L2 switch 20-1 is a frame transmitted from a terminal 3 under the lower-level L2 switch 20-1. The network address "172.16.10.xx/24" identified based on the source IP address of the IP packet within the frame is already registered in the terminal group table 13. Since the network address is found, the network address searcher 15a does not perform a learning process using the MAC learning table 14.

When a network address is found by the network address searcher 15a, the transfer controller 15b transfers a frame to a lower-level switch 20 from a port whose information is stored in the terminal group table 13 in association with the searched network address. In this case, the transfer controller 15b adds, to the frame, the pass-through notification bit indicating that transfer of the frame to the GW 2a is not performed, and transfers the frame having the pass-through notification bit added thereto. The transfer controller 15b corresponds to an example of a first transfer controller.

For example, it is assumed the network address "172.16.40.xx/24" is found by the network address searcher 15a, and the transfer controller 15b receives the network address "172.16.40.xx/24" and the received frame from the network address searcher 15a. In this case, the transfer controller 15b acquires a pass-through notification bit "TTT" from the device information DB 12, adds the pass-through notification bit "TTT" to the frame, and identifies the port number "4" that is stored in the terminal group table 13 in association with the network address "172.16.40.xx/24". The pass-through notification bit "TTT" is added to a VLAN-ID included in a VLAN tag of the frame, for example. Then, the transfer controller 15b transfers the frame with the pass-through notification bit "TTT" added thereto to the lower-level L2 switch 20-4 from the port 4 having the identified port number "4".

When the MAC address of the GW 2a is not included in a destination MAC address of a frame or a network address is not found by the network address searcher 15a, the transfer controller 15b transfers the frame as normal. For example, in a case where the destination MAC address of the frame received from the network address searcher 15a is registered in the MAC learning table 14, and registered MAC address is in the same VLAN identified by the received frame, the transfer controller 15b transfers the frame from the corresponding port. In a case where the destination MAC address of the received frame is not registered in the MAC learning table 14 or the registered MAC address is not in the same VLAN identified by the received frame, the transfer controller 15b executes flooding with the frame or discards the frame.

The operation determining unit 16 determines whether the upper-level L2 switch 10 operates as an upper-level L2 switch or a lower-level L2 switch. For example, the operation determining unit 16 acquires operational information from the device information DB 12 and determines, based on the acquired operational information, whether the upper-level L2 switch 10 operates as an upper-level L2 switch or a lower-level L2 switch. In the first embodiment, "upper-level" that indicates that the upper-level L2 switch 10 operates as an upper-level L2 switch is stored in the operational information acquired from the device information DB 12. Thus, the operation determining unit 16 determines that the upper-level L2 switch 10 operates as an upper-level L2 switch. Then, the operation determining unit 16 outputs the determination result to the controller 15. The controller 15 uses the determination result as a trigger to active the network address searcher 15a and the transfer controller 15b.

Figure 8:
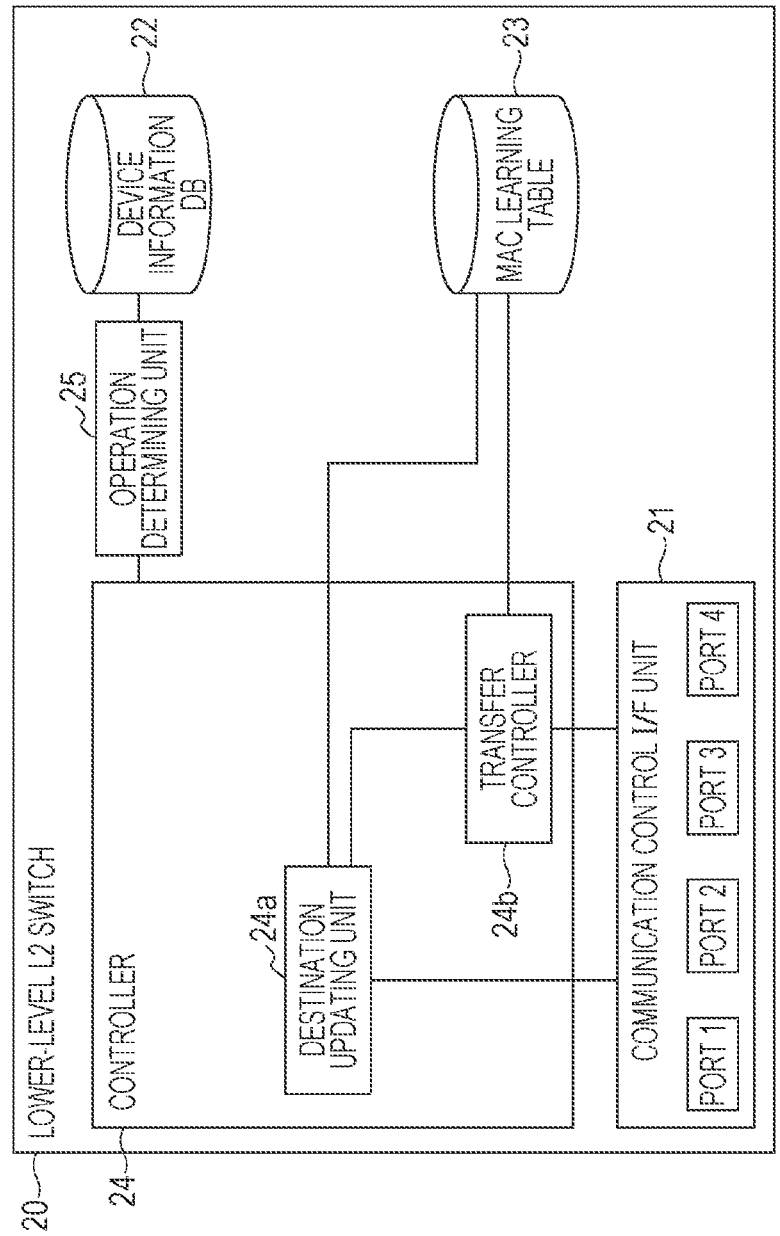
FIG. 8 is a diagram illustrating a configuration example of a lower-level L2 switch, according to a first embodiment.

Next, a configuration of each lower-level L2 switch 20 illustrated in FIG. 1 is described. FIG. 8 is a diagram illustrating a configuration example of a lower-level L2 switch, according to a first embodiment. As illustrated in FIG. 8, the lower-level L2 switch 20 includes a communication control I/F unit 21, a device information DB 22, a MAC learning table 23, a controller 24, and an operation determining unit 25.

The controller 24 and the operation determining unit 25 may be integrated circuits or electronic circuits. The device information DB 22 and the MAC learning table 23 may be storage devices such as semiconductor elements or hard disks.

The communication control I/F unit 21 is an interface that has ports 1 to 4 with port numbers 1 to 4 assigned thereto and is configured to control communication with other devices.

The communication control I/F unit 21 receives a frame via a predetermined port and outputs the received frame to a destination updating unit 24a (described later). The communication control I/F unit 21 transmits a frame output from the destination updating unit 24b (described later) to a destination via a predetermined port.

Figures 9, 10:
FIG. 9 is a diagram illustrating an example of a device information DB, according to a first embodiment.
FIG. 10 is a diagram illustrating an example of a MAC learning table, according to a first embodiment.

The device information DB 22 is a database storing various types of setting information on the lower-level L2 switch 20. FIG. 9 is a diagram illustrating an example of a device information DB, according to a first embodiment. As illustrated in FIG. 9, the device information DB 22 stores operational information as the setting information. The operational information indicates whether the lower-level L2 switch 20 operates as an upper-level L2 switch or a lower-level L2 switch. In the example illustrated in FIG. 9, since the lower-level L2 switch 20 operates as a lower-level L2 switch, "lower-level" is stored in the operational information.

The MAC learning table 23 stores information on ports connected to the terminals 3 belonging to the terminal group, terminal identifiers identifying the terminals 3, and information specific to the terminals 3, in association with each other. Every time an association relationship is learned, information on the association relationship (entry) is registered in the MAC learning table 23. The MAC learning table 23 corresponds to an example of the second storage unit. FIG. 10 is a diagram illustrating an example of a MAC learning table, according to a first embodiment. As an example, it is assumed that the MAC learning table 23 illustrated in FIG. 10 is in a state where a lower-level L2 switch 20 is the lower-level L2 switch 20-4. As illustrated in FIG. 10, the MAC learning table 23 stores items for ports, IP addresses, and MAC addresses, in association with each other.

The item 'port' indicates an identification number of a port connected to the terminal belonging to the VLAN #4 serving as the terminal group. The item 'IP address' indicates a terminal identifier identifying a terminal 3 belonging to the VLAN #4. The item 'MAC address' indicates information specific to the terminal 3 belonging to the VLAN #4. As the items 'port', 'IP address', and 'MAC address', the identification number of the port connected to the upper-level L2 switch 10, the IP address identifying the upper-level L2 switch 10, and the MAC address of the upper-level L2 switch 10 may be stored, respectively.

For example, a first row of the MAC learning table 23 illustrated in FIG. 10 indicates that a terminal 3 that has an IP address "172.16.40.1/24" and a MAC address "AAAA" is connected to the port 1 with the port number "1". A second row of the MAC learning table 23 illustrated in FIG. 10 indicates that a terminal 3 that has an IP address "172.16.40.2/24" and a MAC address "BBBB" is connected to the port 2 with the port number "2". A third row of the MAC learning table 23 illustrated in FIG. 10 indicates that a terminal 3 that has an IP address "172.16.40.3/24" and a MAC address "CCCC" is connected to the port 3 with the port number "3". A fourth row of the MAC learning table 23 illustrated in FIG. 10 indicates that a terminal 3 that has an IP address "172.16.40.254/24" and a MAC address "UUUU" is connected to the port 4 with the port number "4". As illustrated in FIG. 10, the lower-level L2 switches 20 each hold association relationships among ports, IP addresses, and MAC addresses only for terminals 3 under the lower-level L2 switch 20 and do not hold association relationships for terminals 3 under the other lower-level switches 20. Thus, an increase in the number of entries in the MAC learning table 23 for each of the lower-level L2 switches 20 is suppressed.

Returning to FIG. 8, the controller 24 is a controller configured to control transfer of a frame and includes the destination updating unit 24a and the transfer controller 24b. The controller 24 may include an internal memory storing various types of data, a control program, and a program defining various process procedures.

The destination updating unit 24a receives a frame transferred by the upper-level L2 switch 10. The destination updating unit 24a updates a destination MAC address of the received frame using a MAC address of a terminal 3 that is stored in the MAC learning table 23 in association with a destination IP address of an IP packet within the received frame. Specifically, when the received frame has the pass-through notification bit added thereto, the destination updating unit 24a updates the destination MAC address of the frame. The destination updating unit 24a corresponds to an example of an updating unit. For example, it is assumed that a frame including the MAC address of the GW 2a in a destination IP address and an IP address of a terminal 3 belonging to the VLAN #4 in a destination IP address is transferred by the upper-level L2 switch 10 and the destination updating unit 24 receives the frame, where the IP address of the terminal 3 belonging to the VLAN #4 is "172.16.40.3/24". In addition, it is assumed that the frame transferred by the upper-level L2 switch 10 to the lower-level L2 switch 20 has the pass-through notification bit added thereto.

The destination updating unit 24a determines whether or not the received frame has the pass-through notification bit added thereto. In this case, since the received frame has the pass-through notification bit added thereto, the destination updating unit 24a identifies the MAC address "CCCC" of the terminal 3 that is stored in the MAC learning table 23 in association with the destination IP address "172.16.40.3/24" of the IP packet within the frame. Then, the destination updating unit 24a uses the identified MAC address "CCCC" of the terminal 3 to update the destination MAC address of the frame from the MAC address of the GW 2a to the MAC address "CCCC" of the terminal 3. After that, the destination updating unit 24a outputs, to the transfer controller 24b, the frame with the destination MAC address updated to the MAC address "CCCC" of the terminal 3.

When the received frame does not have the pass-through notification bit, the destination updating unit 24a does not update the destination MAC address of the received frame and outputs the frame to the transfer controller 24b.

Every time a frame is received, the destination updating unit 24a associates a port via which the frame is received, a source IP address, and a source MAC address with each other, and the destination updating unit 24a causes the MAC learning table 23 to learn information thereon by storing the information in the MAC learning table 23. When an association relationship between the port via which the frame is received, the source IP address, and the source MAC address is already learned, the destination updating unit 24a does not cause the MAC learning table 23 to learn the association relationship.

Upon receiving a frame from the destination updating unit 24a, the transfer controller 24b transfers the frame having the destination MAC address updated by the destination updating unit 24a from a port whose information is stored in the MAC learning table 23 in association with a destination IP address of an IP packet within the frame received from the destination updating unit 24a. The transfer controller 24b corresponds to an example of a second transfer controller.

For example, it is assumed that the transfer controller 24b receives, from the destination updating unit 24a, a frame having a destination MAC address updated to the MAC address "CCCC" of the terminal 3. In addition, it is assumed that a destination IP address of an IP packet within the frame having the destination MAC address updated to the MAC address "CCCC" of the terminal 3 is "172.16.40.3/24". In this case, the transfer controller 24b references the MAC learning table 23 and identifies the port number "3" associated with the destination IP address "172.16.40.3/24". Then, the transfer controller 24b transfers the frame to the terminal 3 from the port 3 with the identified port number "3".

Upon receiving, from the destination updating unit 24a, a frame not having the pass-through notification bit, the transfer controller 24b transfers the frame as normal. When a destination MAC address of the frame received from the destination updating unit 24a is registered in the MAC learning table 23, and registered MAC address is in the same VLAN identified by the received frame, the transfer controller 24b transfers the frame from a corresponding port. When the destination MAC address of the received frame is not registered in the MAC learning table 23 or the registered MAC address is not in the same VLAN identified by the received frame, the transfer controller 24b executes flooding with the frame or discards the frame.

The operation determining unit 25 determines whether the lower-level L2 switch 20 operates as an upper-level L2 switch or a lower-level L2 switch. For example, the operation determining unit 25 acquires operational information from the device information DB 22 and determines, based on the acquired operational information, whether the lower-level L2 switch 20 operates as an upper-level L2 switch or a lower-level L2 switch. In the first embodiment, "lower-level" indicating that the lower-level L2 switch 20 operates as a lower-level L2 switch is stored in the operational information acquired from the device information DB 22. Thus, the operation determining unit 25 determines that the lower-level L2 switch 20 operates as a lower-level L2 switch. Then, the operation determining unit 25 outputs the determination result to the controller 24. The controller 24 uses the determination result as a trigger to activate the destination updating unit 24a and the transfer controller 24b.

Next, the flow of a process that is executed by the switch communication system 1 according to the first embodiment is described with reference to FIGS. 11A and 11B. FIGS. 11A and 11B are diagrams illustrating an example of an operational flowchart executed by a switch communication system, according to a first embodiment. As illustrated in FIG. 11A, when a frame is not received (No in step S101), the upper-level L2 switch 10 of the switch communication system 1 or each of the lower-level L2 switches 20 of the switch communication system 1 waits.

Upon receiving a frame (Yes in step S101), the operation determining unit 16 of the upper-level L2 switch 10 or the operation determining unit 25 of the lower-level L2 switch 20 executes the following process. The operation determining unit 16 of the upper-level L2 switch 10 or the operation determining unit 25 of the lower-level L2 switch 20 acquires operational information from the device information DB 12 or the device information DB 22 and determines whether or not "upper-level" is already set in the acquired operational information (in step S102). When "upper-level" is already set in the operational information (Yes in step S102), the operation determining unit 16 of the upper-level L2 switch 10 determines that the upper-level L2 switch 10 operates as an upper-level L2 switch. The controller 15 of the upper-level L2 switch 10 uses the determination result as a trigger to active the network address searcher 15a and the transfer controller 15b.

The network address searcher 15a identifies a network address based on a source IP address of an IP packet within the received frame (in step S103). The network address searcher 15a searches the terminal group table 13 for the identified network address (in step S104). When the network address is not found (No in step S105), the network address searcher 15a associates a port via which the frame is received, the source IP address, and a source MAC address with each other and the network address searcher 15a causes the MAC learning table 14 to learn information thereon by storing the information in the MAC learning table 14 (in step S106).

When the network address is found (Yes in step S105), the network address searcher 15a does not cause the MAC learning table 14 to learn information thereon and causes the process to proceed to step S107.

Subsequently, the network address searcher 15a determines whether or not the MAC address of the GW 2a is included in a destination MAC address of the frame (in step S107). When the MAC address of the GW 2a is included in the destination MAC address (Yes in step S107), the network address searcher 15a identifies a network address based on a destination IP address of the IP packet within the frame (in step S108). The network address searcher 15a searches the identified network address from the terminal group table 13 (in step S109).

When the network address is found by the network address searcher 15a (Yes in step S110), the transfer controller 15b adds the pass-through notification bit to the frame (in step S111). In addition, the transfer controller 15b identifies a port whose information is stored in the terminal group table 13 in association with the found network address (in step S112). Then, the transfer controller 15b transfers the frame to the lower-level L2 switch 20 from the identified port (in step S113).

When the MAC address of the GW 2a is not included in the destination MAC address (No in step S107) or the network address is not found (No in step S110), the transfer controller 15b performs a normal frame-transfer process described in steps S114 and later.

The transfer controller 15b determines whether or not the destination MAC address of the received frame is already registered in the MAC learning table 14 (in step S114). When the destination MAC address is already registered in the MAC learning table 14 (Yes in step S114), the transfer controller 15b determines whether or not registered MAC address is in the same VLAN identified by the received frame (in step S115). When the registered MAC address is in the same VLAN identified by the received frame (Yes in step S115), the transfer controller 15b identifies a port whose information is stored the MAC learning table 14 in association with the destination IP address (in step S116). Then, the transfer controller 15b transfers the frame from the identified port to a destination of the frame (in step S117).

When the destination MAC address of the received frame is not registered in the MAC learning table 14 (No in step S114) or the registered MAC address is not in the same VLAN identified by the received frame (No in step S115), the transfer controller 15b executes the following process. That is, the transfer controller 15b executes flooding with the frame or discards the frame (in step S118).

When "lower-level" is set in the operational information (No in step S102), the operation determining unit 25 of the lower-level L2 switch 20 determines that the lower-level L2 switch 20 operates as a lower-level L2 switch. The controller 24 of the lower-level L2 switch 20 uses the determination result as a trigger to active the destination updating unit 24a and the transfer controller 24b.

The destination updating unit 24a associates a port via which the frame is received, a source IP address, and a source MAC address with each other and the destination updating unit 24a causes the MAC learning table 23 to learn information thereon by storing the information in the MAC learning table 23 (in step S119). When an association relationship between the port via which the frame is received, the source IP address, and the source MAC address is already learned, the destination updating unit 24a does not cause the MAC learning table 23 to learn information thereon and causes the process to proceed to step S120.

Subsequently, the destination updating unit 24a determines whether or not the received frame has the pass-through notification bit added thereto (in step S120). when the received frame has the pass-through notification bit added thereto (Yes in step S120), the destination updating unit 24a executes the following process. The destination updating unit 24a identifies a MAC address of a terminal 3 that is stored in the MAC learning table 23 in association with the destination IP address of the IP packet within the frame (in step S121). Then, the destination updating unit 24a uses the identified MAC address of the terminal 3 to update the destination MAC address of the frame from the MAC address of the GW 2a to the MAC address of the terminal 3 (in step S122).

After that, the transfer controller 24b identifies a port whose information is stored in the MAC learning table 23 in association with the destination IP address of the IP packet within the frame with the updated destination MAC address (in step S116) and transfers the frame to the terminal 3 from the identified port (in step S117).

On the other hand, when the received frame does not have the pass-through notification bit (No in step S120), the transfer controller 24b performs a normal frame-transfer process as described in steps S114 and later.

According to the first embodiment, the upper-level L2 switch 10 holds only the association relationships between the ports and the network addresses that are the first halves of the IP addresses and transfers a frame to a terminal 3 under a lower-level L2 switch 20 without causing the frame to pass through the GW 2a of the L3 network 2, based on the association relationships. As a result, the upper-level L2 switch 10 may suppress the amount of a memory to be used when a frame is transferred without passing through the GW of the L3 network, compared with the conventional technique for learning association relationships among ports, IP addresses, and MAC addresses for all terminals under an L2 switch. In addition, the lower-level L2 switches 20 each hold association relationships among ports, IP addresses, and MAC addresses within a single VLAN and thus may suppress the amount of a memory to be used, compared with the conventional technique for learning association relationships for a plurality of VLANs by a single L2 switch. As a result, the upper-level L2 switch 10 and the lower-level L2 switches 20 may each suppress the amount of a memory to be used when a frame is transferred without passing through the GW of the L3 network.

According to the first embodiment, the upper-level L2 switch 10 adds, to a frame, the pass-through notification bit indicating that the frame is not transferred to the GW 2a, and the upper-level L2 switch 10 transfers the frame with the pass-through notification bit to a lower-level L2 switch 20. When the transferred frame has the pass-through notification bit added thereto, the lower-level L2 switch 20 updates a destination MAC address of the frame using a MAC address of a terminal 3 that is stored in the MAC learning table 23 in association with a destination IP address of an IP packet within the frame. Since the lower-level L2 switch 20 updates only the destination information of the frame with the pass-through notification bit added thereto, a processing load to be imposed due to the updating of the destination information may be reduced.

According to the first embodiment, when a network address identified based on a destination IP address of an IP packet within a received frame is found from the terminal group table 13, the upper-level L2 switch 10 does not cause the MAC learning table 14 to learn a port via which the frame is received and the like. Thus, the upper-level L2 switch 10 may avoid an increase in the number of entries of the MAC learning table 14 and thereby suppress the amount of a memory to be used when a frame is transferred without passing through the GW of the L3 network.

Second Embodiment

The first embodiment describes the example in which the lower-level L2 switches 20 each update a destination MAC address, by using a MAC address of a terminal 3 that is stored in the MAC learning table 23 in association with a destination IP address of an IP packet within a frame transferred by the upper-level L2 switch 10. The lower-level L2 switches 20, however, may be each configured to update a destination MAC address of a frame transferred by the upper-level L2 switch 10, by using a broadcast MAC address for transferring the frame to all terminals 3 belonging to a VLAN. A second embodiment describes an example in which a lower-level L2 switch updates a destination MAC address of a frame transferred by the upper-level L2 switch 10 by using the broadcast MAC address for transferring the frame to all terminals 3 belonging to a VLAN. In the following description, a description of operations of units that are the same as the first embodiment is omitted.

Figure 12:
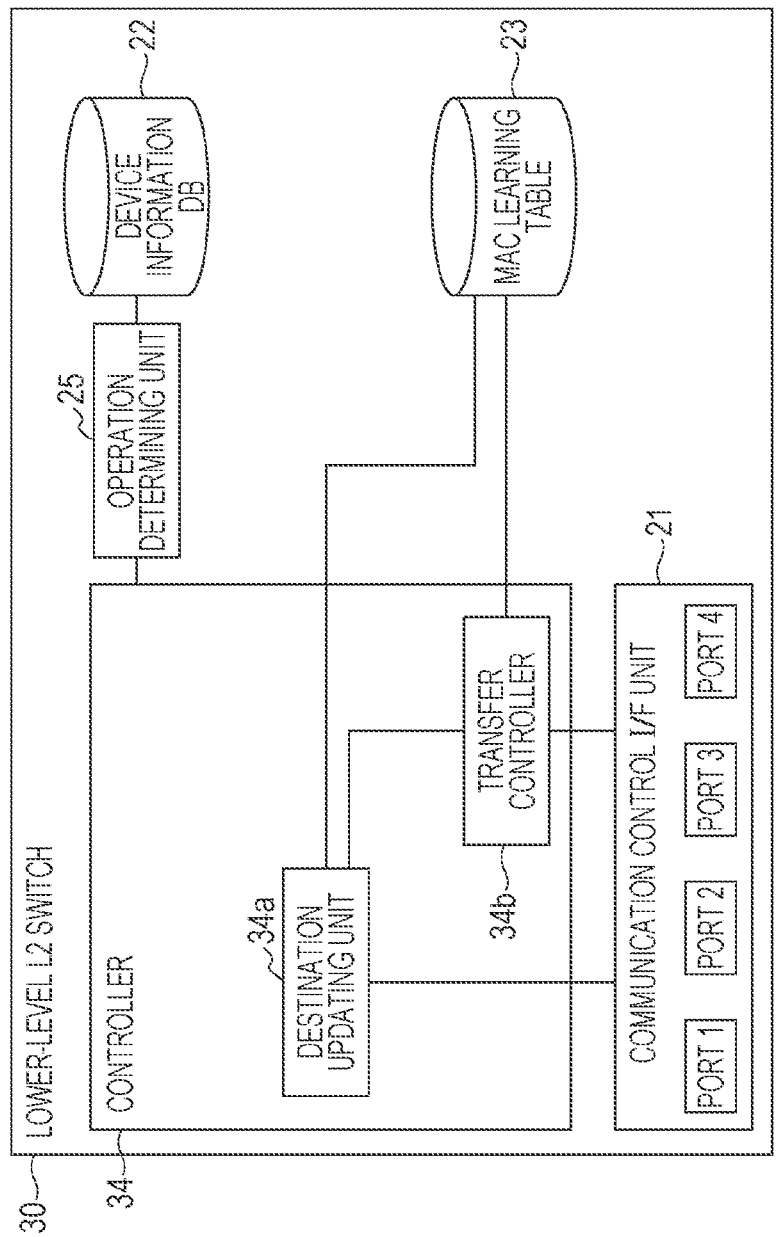
FIG. 12 is a diagram illustrating a configuration example of a lower-level L2 switch, according to a second embodiment.

First, a configuration of a lower-level L2 switch 30 according to a second embodiment is described. FIG. 12 is a diagram illustrating a configuration example of a lower-level L2 switch, according to a second embodiment. A configuration of an upper-level L2 switch 10 according to the second embodiment is similar to the configuration of the upper-level L2 switch 10 illustrated in FIG. 4, and a description thereof is omitted.

As illustrated in FIG. 12, the lower-level L2 switch 30 includes a communication control I/F unit 21, device information DB 22, a MAC learning table 23, a controller 34, and an operation determining unit 25. The communication control I/F unit 21, device information DB 22, MAC learning table 23, and operation determining unit 25 of the lower-level L2 switch 30 are the same as the communication control I/F unit 21, the device information DB 22, the MAC learning table 23, and the operation determining unit 25 that are illustrated in FIG. 8.

The controller 34 is a controller configured to control transfer of a frame and includes a destination updating unit 34a and a transfer controller 34b. The controller 34 may include an internal memory storing various types of data, a control program, and a program defining various process procedures.

The destination updating unit 34a receives a frame transferred by the upper-level L2 switch 10 and including the MAC address of the GW 2a in a destination MAC address. Then, the destination updating unit 34a updates the destination MAC address of the frame by using the broadcast MAC address that indicates the MAC addresses of all terminals 3 belonging to a VLAN and causes the frame to be transferred to all the terminals 3 belonging to the VLAN. Specifically, when the received frame has the pass-through notification bit added thereto, the destination updating unit 34a updates the destination MAC address of the frame by using the broadcast MAC address, without referencing the MAC learning table 23. For example, it is assumed that a frame that includes the MAC address of the GW 2a in a destination MAC address and includes an IP address of a terminal 3 belonging to the VLAN #4 in a destination IP address is transferred by the upper-level L2 switch 10 and the destination updating unit 34 receives the frame. In addition, it is assumed that the frame transferred by the upper-level L2 switch 10 to the lower-level L2 switch 30 has the pass-through notification bit added thereto.

The destination updating unit 34a determines whether or not the received frame has the pass-through notification bit added thereto. In this case, since the received frame has the pass-through notification bit added thereto, the destination updating unit 34a does not reference the MAC learning table 23 and uses the broadcast MAC address to update the destination MAC address of the frame from the MAC address of the GW 2a. The broadcast MAC address is "FF:FF:FF:FF:FF:FF", for example. After that, the destination updating unit 34a outputs, to the transfer controller 34b, the frame having the destination MAC address updated to the broadcast MAC address.

When the received frame does not have the pass-through notification bit, the destination updating unit 34b causes the MAC learning table 23 to learn a port and the like and outputs the frame to the transfer controller 34b without updating the destination MAC address of the received frame.

The transfer controller 34b receives the frame from the destination updating unit 34a. The transfer controller 34b broadcasts the frame having the destination MAC address updated by the destination updating unit 34a from all the ports connected to the terminals 3 belonging to the VLAN.

For example, it is assumed that the transfer controller 34b receives, from the destination updating unit 34a, a frame having a destination MAC address updated to the broadcast MAC address. In this case, the transfer controller 34b does not reference the MAC learning table 23 and broadcasts the frame to the terminals 3 from all the ports 1 to 3 connected to the terminals 3 belonging to the VLAN.

When the transfer controller 34b receives, from the destination updating unit 34a, a frame that does not have the pass-through notification bit, the transfer controller 34b transfers the frame as normal. Specifically, when a destination MAC address of the frame received from the destination updating unit 34a is already registered in the MAC learning table 23 and registered MAC address is in the same VLAN identified by the received frame, the transfer controller 34b transfers the frame from the corresponding port. On the other hand, when the destination MAC address of the frame received from the destination updating unit 34a is not registered in the MAC learning table 23 or the registered MAC address is not in the same VLAN identified by the received frame, the transfer controller 34b executes flooding with the frame or discards the frame.

Figure 13B:
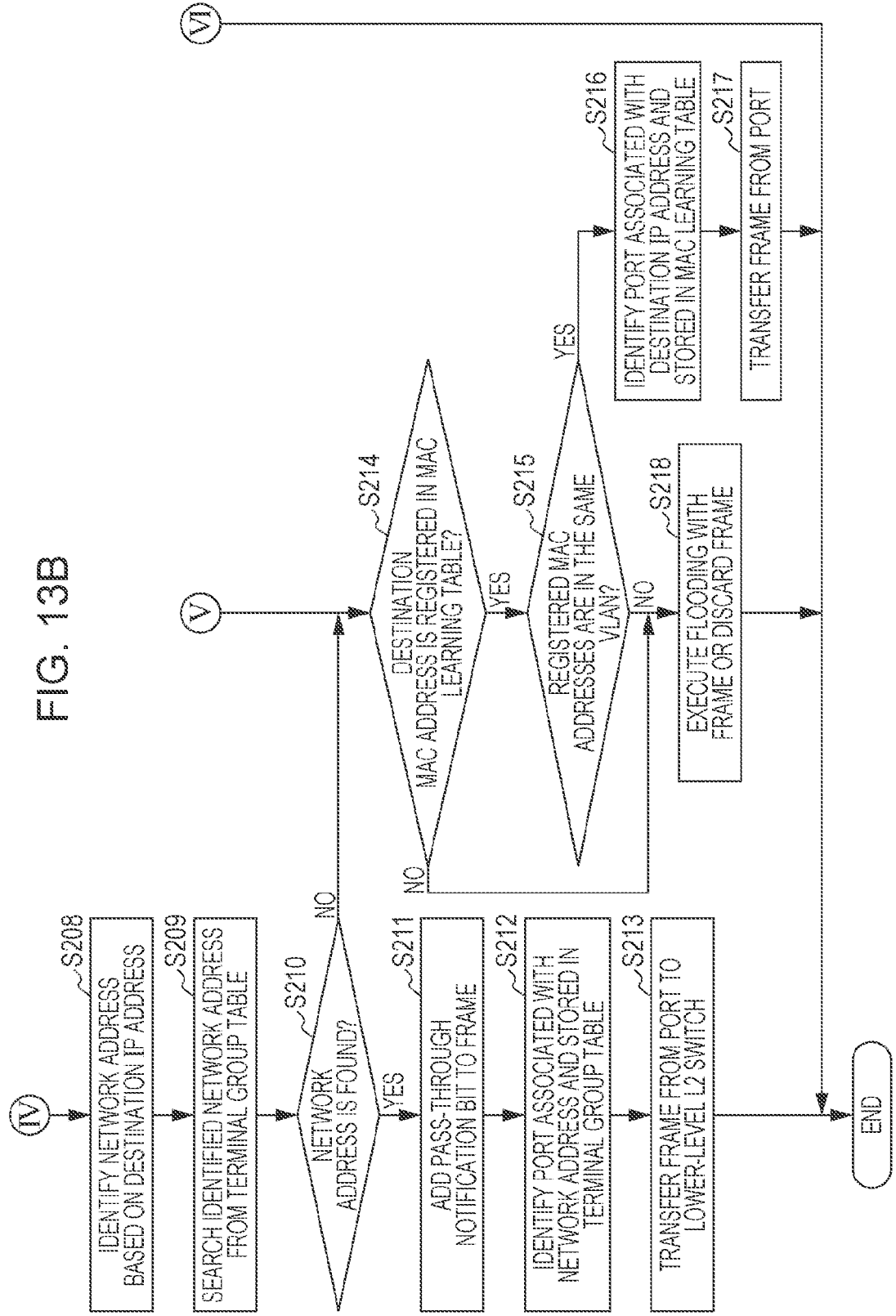

Next, the flow of a process that is executed by the switch communication system 1 according to the second embodiment is described with reference to FIGS. 13A and 13B. FIGS. 13A and 13B are diagrams illustrating an example of an operational flowchart for a process that is executed by a switch communication system, according to a second embodiment. A process procedure of steps S201 to S218 illustrated in FIGS. 13A and 13B is the same as the process procedure of steps S101 to S118 illustrated in FIGS. 11A and 11B, and a description thereof is omitted.

When "lower-level" is set in operational information (No in step S202), the operation determining unit 25 of the lower-level L2 switch 30 determines that the lower-level L2 switch 30 operates as a lower-level L2 switch. The controller 34b of the lower-level L2 switch 30 uses the determination result as a trigger to activate the destination updating unit 34a and the transfer controller 34b.

The destination updating unit 34a determines whether or not a received frame has the pass-through notification bit added thereto (in step S219). When the frame does not have the pass-through notification bit (No in step S219), the destination updating unit 34a associates a port via which the frame is received, a source IP address, and a source MAC address, in association with each other, and the destination updating unit 34a causes the MAC learning table 23 to learn information thereon (in step S220). After that, the destination updating unit 34a outputs the frame to the transfer controller 34b without changing the frame and causes the process to proceed to step S214.

When the received frame has the pass-through notification bit added thereto (Yes in step S219), the destination updating unit 34a uses the broadcast MAC address to update the destination MAC address of the frame from the MAC address of the GW 2a (in step S221).

After that, the transfer controller 34b broadcasts the frame having the destination MAC address updated by the destination updating unit 34a from all the ports connected to the terminals 3 belonging to the VLAN (in step S222).

According to the second embodiment, the lower-level L2 switch 30 updates a destination MAC address of the frame transferred by the upper-level L2 switch 10, by using the broadcast MAC address for transfer of a frame to all the terminals 3 belonging to the VLAN. Then, the lower-level L2 switch 30 broadcasts the frame having the updated destination MAC address from all the ports connected to the terminals 3 belonging to the VLAN. Thus, the lower-level L2 switch 30 may transfer the frame to all the terminals 3 belonging to the VLAN without using MAC addresses of the terminals 3 stored in the MAC learning table 23. As a result, the lower-level L2 switch 30 may reduce a load to be imposed due to an overall process of transferring a frame without causing the frame to pass through the GW of the L3 network.

Hardware Configurations

Figure 14:
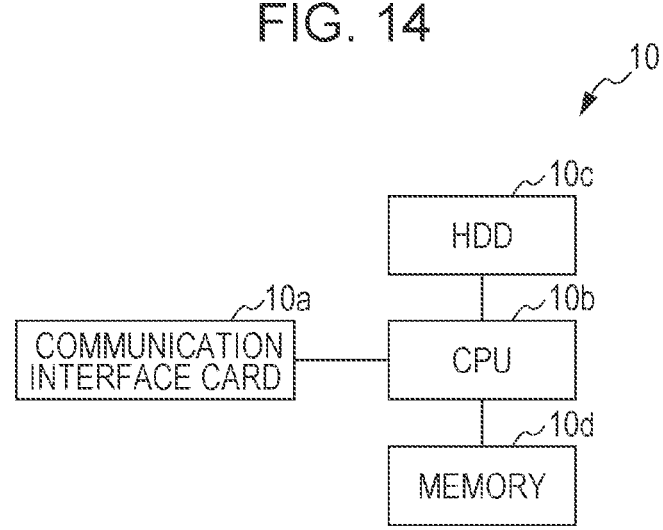
FIG. 14 is a diagram illustrating an example of a hardware configuration of an upper-level L2 switch, according to an embodiment.

The upper-level L2 switch 10 and lower-level L2 switches 20 and 30 according to the first and second embodiments may be achieved by the following hardware configurations. FIG. 14 is a diagram illustrating an example of a hardware configuration of an upper-level L2 switch, according to an embodiment. The upper-level L2 switch 10 may be implemented, as hardware, by an upper-level L2 switch 10 illustrated in FIG. 14. As illustrated in FIG. 14, the upper-level L2 switch 10 includes a communication interface card 10a, a central processing unit (CPU) 10b, a hard disk drive (HDD) 10c, and a memory 10d. The memory 10d may be a RAM such as an SDRAM, a ROM, or a flash memory. The communication control I/F unit 11 may be implemented by the communication interface card 10a. The network address searcher 15a, the transfer controller 15b, and the operation determining unit 16 may be implemented by the CPU 10b, for example. The device information DB 12, the terminal group table 13, and the MAC learning table 14 may be implemented by the CPU 10b and the HDD 10c or the memory 10d, for example.

The aforementioned processes may be achieved by causing the CPU 10b to execute prepared programs. Specifically, the programs that correspond to the processes to be executed by the network address searcher 15a, the transfer controller 15b, and the operation determining unit 16 may be stored in the HDD 10c or the memory 10d in advance and read into the CPU 10b so as to function as the processes. The programs do not necessarily need to be stored in the HDD 10c or the memory 10d. For example, the programs may be stored in a portable recording medium connectable to the upper-level L2 switch 10, such as a flexible disk (FD), a CD-ROM, a magneto-optical (MO) disc, a DVD, an IC card, or a memory card. In this case, the programs may be read into the CPU 10b so as to function as the processes. For example, the programs may be beforehand stored in a computer, server, or the like that is coupled to the upper-level L2 switch 10 through the Internet, a LAN, a WAN, or the like, via wireless or wired connection, and thereafter the programs may be read into CPU 10b to function as the processes.

Figure 15:
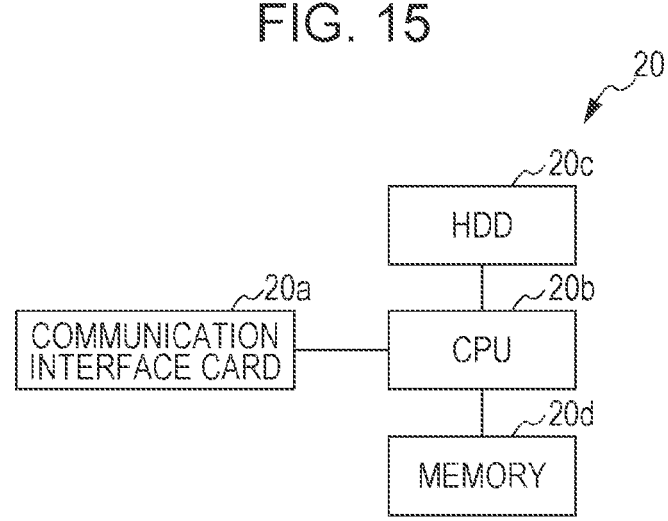
FIG. 15 is a diagram illustrating an example of a hardware configuration of a lower-level L2 switch, according to an embodiment.

FIG. 15 is a diagram illustrating an example of a hardware configuration of a lower-level L2 switch, according to an embodiment. The lower-level L2 switches 20 and 30 may be each implemented, as hardware, by a lower-level L2 switch 20 illustrated in FIG. 15. Specifically, as illustrated in FIG. 15, the lower-level L2 switch 20 includes a communication interface card 20a, a CPU 20b, an HDD 20c, and a memory 20d. The memory 20d may be a RAM such as an SDRAM, a ROM, or a flash memory, for example. The communication control I/F unit 21 may be implemented by the communication interface card 20a. The destination updating units 24a, 34a, the transfer controllers 24b, 34b, and the operation determining unit 25 may be implemented by the CPU 20b, for example. The device information DB 22 and the MAC learning table 23 may be implemented by the CPU 20b and the HDD 20c or the memory 20d, for example.

The aforementioned processes may be implemented by causing the CPU 20b to execute prepared programs. Specifically, the programs that correspond to the processes to be executed by the destination updating units 24a, 34a, the transfer controllers 24b, 34b, and the operation determining unit 25 may be stored in the HDD 20c or the memory 20d in advance and read into the CPU 20b so as to function as the processes. In addition, the programs do not necessarily need to be stored in the HDD 20c or the memory 20d in advance. For example, the programs may be stored in a portable recording medium connectable to the lower-level L2 switch 20, such as a flexible disk (FD), a CD-ROM, an MO disc, a DVD, an IC card, or a memory card. In this case, the programs may be read into the CPU 20b so as to function as the processes. For example, the programs may be stored in a computer, server, or the like, that is coupled to the lower-level L2 switch 20 through the Internet, a LAN, a WAN, or the like, via wireless or wired connection, and thereafter the programs may be read into the CPU 20b to function as the processes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
an upper-level device; and
a plurality of lower-level devices configured to communicate with the upper-level device, wherein
the upper-level device is connected to a Layer 3 network through a gateway and includes:
a first storage unit that stores information on a port connected to each of the plurality of lower-level devices, in association with a group identifier identifying a terminal group including a plurality of terminals under control of the each lower-level device,
a searcher configured to identify, upon receiving a first frame whose destination information includes information specific to the gateway, based on a first terminal identifier identifying a first terminal that is a destination of a packet within the first frame, a first group identifier identifying a first terminal group to which the first terminal belongs, and to search the first storage unit for the identified first group identifier, and
a first transfer controller configured to transfer, when the first group identifier is found in the first storage unit, the first frame from a port that is associated with the first group identifier in the first storage unit; and
the plurality of lower-level devices each include:
a second storage unit that stores information on a port connected to each terminal belonging to a terminal group, a terminal identifier identifying the each terminal, and information specific to the each terminal, in association with each other,
an updating unit configured to update the destination information of the first frame received from the upper-level device, by using information that is specific to the first terminal and stored in the second storage unit in association with the first terminal identifier, and
a second transfer controller configured to transfer the first frame having the destination information updated by the updating unit from a port whose information is stored in the second storage unit in association with the first terminal identifier.

2. The system of claim 1, wherein
the first transfer controller adds, to the first frame, a notification bit indicating that the first frame is not to be transferred to the gateway, and transfers the first frame having the notification bit added thereto; and
upon receiving the first frame having the notification bit added thereto, the updating unit of the each lower-level device updates the destination information of the first frame, by using the information that is specific to the terminal and stored in the second storage unit in association with the first terminal identifier.

3. The system of claim 1, wherein
upon receiving the first frame having the notification bit added thereto, the updating unit of the each lower-level device updates the destination information of the first frame, by using broadcast information that is information specific to terminals and used to transfer a frame to all terminals belonging to a terminal group; and
the second transfer controller of the each lower-level device broadcasts the first frame having the destination information updated by the updating unit from all ports connected to terminals belonging to the first terminal group.

4. The system of claim 1, wherein
upon receiving a second frame, the searcher identifies, based on a second terminal identifier identifying a second terminal that is a source of a packet within the second frame, a second group identifier identifying a second terminal group to which the second terminal belongs and the searcher searches the first storage unit for the second group identifier;
when the second group identifier is not found, the searcher causes a predetermined learning table to learn a port via which the second frame is received, the second terminal identifier, and information specific to the second terminal, in association with each other, by storing, in the predetermined learning table, information on the port, the second terminal identifier, and the information specific to the second terminal, in association with each other; and
when the second group identifier is found, the searcher does not cause the learning table to learn the port, the second terminal identifier, and the information specific to the second terminal.

5. The system of claim 1, wherein
the upper-level device and the lower-level devices each include an operation determining unit configured to determine whether the each of the upper-level device and the lower-level devices operates as an upper-level device or a lower-level device;
when the operation determining unit determines that the each of the upper-level device and the lower-level devices operates as an upper-level device, the determining unit causes the searcher and the first transfer controller thereof to be activated; and
when the operation determining unit determines that the each of the upper-level device and the lower-level devices operates as a lower-level device, the operation determining unit causes the updating unit and the second transfer controller thereof to be activated.

6. A method to be executed by an upper-level device and a plurality of lower-level devices configured to communicate with the upper-level device, the method comprising:
providing the upper-level device connected to a Layer 3 network through a gateway, with a first storage unit that stores information on a port connected to each of the plurality of lower-level devices in association with a group identifier identifying a terminal group including a plurality of terminals under control of the each lower-level device;
causing the upper-level device:
to identify, upon receiving a first frame whose destination information include information specific to the gateway, based on a first terminal identifier identifying a first terminal that is a destination of a packet within the first frame, a first group identifier identifying a first terminal group to which the first terminal belongs,
to search the first storage unit for the first group identifier, and
to transfer, when the first group identifier is found in the first storage unit, the first frame from a port that is associated with the first group identifier in the first storage unit; and
providing the each lower-level device with a second storage unit that stores information on a port connected to each terminal belonging to a terminal group, a terminal identifier identifying the each terminal, and information specific to the each terminal, in association with each other; and
causing the each lower-level device:

to update, upon receiving the first frame, the destination information of the first frame by using information that is specific to the first terminal and stored in the second storage unit in association with the first terminal identifier, and
to transfer the first frame having the updated destination information from a port whose information is stored in the second storage unit in association with the first terminal identifier.

7. An apparatus connected to a Layer 3 network through a gateway and configured to communicate with a plurality of lower-level devices, the apparatus comprising:
a memory configured to store information on a port connected to each of the plurality of lower-level devices, in association with a group identifier identifying a terminal group including a plurality of terminals under control of the each lower-level device; and
a processor coupled to the memory, the processor being configured to:
identify, upon receiving a first frame whose destination information includes information specific to the gateway, based on a first terminal identifier identifying a first terminal that is a destination of a packet within the first frame, a first group identifier identifying a first terminal group to which the first terminal belongs, and to search the memory for the first group identifier, and
transfer, when the first group identifier is found in the memory, the first frame from a port associated with the first group identifier to a first lower-level device controlling the first terminal group identified by the first group identifier so that the first lower-level device updates the destination information of the first frame by using information specific to the first terminal.

* * * * *